United States Patent

[11] 3,587,438

| [72] | Inventors | Donald L. Foster;<br>Lenord Williams, Birmingham, Mich. |
|---|---|---|
| [21] | Appl. No. | 726,605 |
| [22] | Filed | May 3, 1968 |
| [45] | Patented | June 28, 1971 |
| [73] | Assignee | Space/Defense Corporation<br>Birmingham, Mich.<br>Continuation of application Ser. No.<br>585,998, Sept. 21, 1966, now abandoned,<br>which is a continuation-in-part of<br>application Ser. No. 353,983, Mar. 23,<br>1964, now abandoned. |

[54] GASEOUS ATMOSPHERE CONTROL DEVICE
23 Claims, 5 Drawing Figs.

| [52] | U.S. Cl. | 98/1.5 |
|---|---|---|
| [51] | Int. Cl. | B64d 13/04 |
| [50] | Field of Search | 98/1.5;<br>222/55, 52, 57 |

[56] References Cited
UNITED STATES PATENTS

| 3,203,591 | 8/1965 | Daulton | 222/55X |
|---|---|---|---|
| 3,215,057 | 11/1965 | Turek | 98/1.5 |

*Primary Examiner*—Meyer Perlin
*Attorney*—Settle, Batchelder & Oltman

ABSTRACT: A control system for maintaining the composition and pressure of a gas mixture including oxygen at a predetermined total pressure in a chamber and simultaneously maintaining the partial pressure of at least the oxygen at a predetermined level relative to the total pressure of the mixture. The control system is capable of preferentially supplying oxygen from a source to the chamber whenever the oxygen partial pressure is below the predetermined level and supplying a second gas from a source when the total pressure is below the predetermined level while the oxygen is at the predetermined partial pressure level.

INVENTORS
DONALD L. FOSTER
BY LENORD WILLIAMS

WILSON, SETTLE & CRAIG
Attorneys

GASEOUS ATMOSPHERE CONTROL DEVICE

This application is a continuation of our application Ser. No. 585,998 filed Sept. 21, 1966. Application Ser. No. 585,998 is a continuation-in-part of our copending application Ser. No. 353,983, filed Mar. 23, 1964, both now abandoned.

BACKGROUND OF THE INVENTION

The present invention relates to a gaseous atmosphere control device, and more particularly to a control device for controlling the relative quantities of two or more different gases under varying pressure conditions.

The control of gaseous atmospheres has recently been the subject of considerable attention, particularly in the area of outer space vehicles. The control of gaseous atmospheres has, however, also been of considerable interest in industrial processes and in areas aside from outer space vehicles, such as hospital oxygen tents, underwater vehicles, high altitude balloons, experimental chambers for animals and chambers containing perishable items.

One of the problems encountered in the control of a mixed gas atmosphere has been to measure the partial pressure of the gaseous components of the gaseous mixture. Devices have recently been developed for measuring such partial pressures. The present invention provides a method and apparatus incorporating such partial pressure measuring devices along with a total pressure measuring device to maintain the total pressure of the entire gas mixture and the partial pressure of one or more of the components at a predetermined value. Additionally, the invention incorporates means for automatically maintaining the effective mass of one or more gaseous components at a constant value per unit volume regardless of changes in the total pressure.

The maintenance of one or more gaseous components at a predetermined effective mass per unit volume regardless of total pressure is of particular importance in providing a proper respiratory atmosphere for human beings. To maintain a constant rate of oxygen transfer to the blood stream it is necessary to maintain a given mass of oxygen per unit volume within the lung alveoli regardless of the total pressure of the air inhaled. The partial pressure of oxygen within the lungs is termed alveolar oxygen tension. Because of the constant values for carbon dioxide and water vapor partial pressures within the lungs, the partial pressure of oxygen in the inspired atmosphere must be increased to maintain a constant alveolar oxygen tension when reduced total pressures, such as are encountered at high altitudes, are used. At higher total pressures, such as may be encountered at below sea level locations, the partial pressure of the oxygen need not be altered. The principle of the alveolar tension stated in a somewhat simplified manner is that the lungs wish to see a constant quantity of oxygen atoms per unit volume of air which is breathed irrespective of the air pressure. The same principle is also applicable to, for example, some industrial processes in which a chemical reaction may be occurring which is dependent upon the quantity of molecules or atoms of a particular gas per unit volume rather than a specific partial pressure thereof. The invention is adaptable, however, to applications where it is desired to maintain the partial pressure of one or more components at a constant percentage of the total pressure. In such cases, the present invention provides means for adjusting the partial pressure mechanism in accordance with different total pressure requirements.

SUMMARY OF THE INVENTION

It is thus an object of the invention to provide a gaseous atmosphere control device capable of controlling the partial pressure of one or more components of a gaseous mixture on an absolute basis irrespective of the total pressure of the mixture.

Another object is to provide an automatic compensating feature in a control system wherein the mass per unit volume of one or more components of a gaseous mixture may be maintained at a constant effective level irrespective of the total pressure.

Another object is to provide a control system wherein the partial pressure of at least one component of a gaseous mixture is preferentially controlled.

A still further object is to provide a control device which is capable of varying of both the total pressure and the partial pressure of one or more components of a gaseous mixture.

Still another object is to provide a control system for a rigid or flexible chamber wherein the total pressure of a gaseous mixture is maintained at a predetermined level while maintaining the partial pressure of any number of components of the mixture at preselected levels irrespective of the total pressure of the mixture.

Another object is to provide a gaseous atmosphere control system having a relatively simplified structure resulting in a compact unit of relatively low weight and volume.

Other objects of this invention will appear in the following description and appended claims, reference being had to the accompanying drawings forming a part of this specification wherein like reference characters designate corresponding parts in the several views.

IN THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
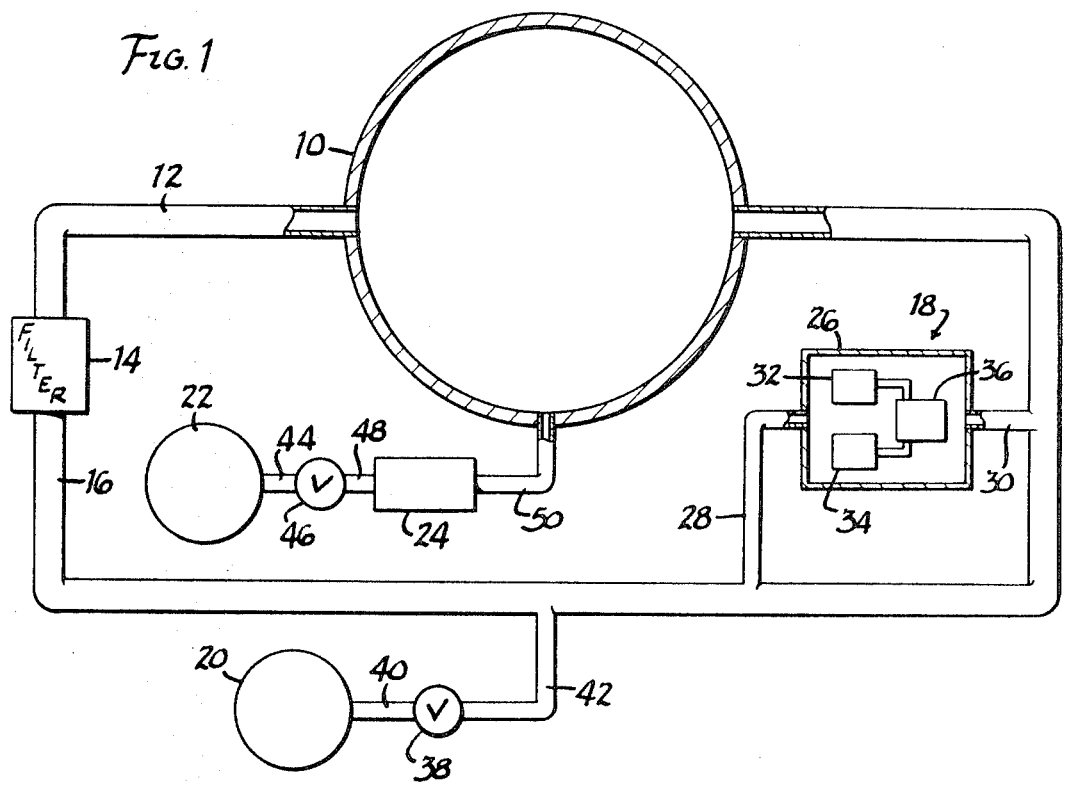
FIG. 1 is a diagrammatic view of an outer space capsule incorporating the control device of the present invention for control of the atmosphere within the capsule.

Referring to FIG. 1, a sealed cabin 10 forms part of a space capsule. The cabin 10 is for occupancy by the personnel aboard the space capsule and consequently must be provided with an atmosphere suitable for human comfort. A portion of the atmosphere within the cabin 10 is constantly withdrawn through a conduit 12. The conduit 12 directs exhaust gases into a filter 14 wherein carbon dioxide and other undesirable components of the gaseous mixture are removed and also wherein the humidity of the exhaust gases is corrected to a comfort level. The filtered gases are withdrawn from the filter 14 through a conduit 16 which conducts the decontaminated gases back to the cabin 10.

The atmosphere within the cabin 10 is, of course, primarily a mixture of oxygen and an inert gas, such as nitrogen or helium. The oxygen component of this mixture is of primary importance with respect to human survival. Consequently, control of the oxygen is accorded preferential treatment in the preferred control system. An oxygen partial pressure control mechanism 18 is interconnected with the conduit 16. The control mechanism 18 may, however, be directly connected to or placed within the cabin 10 if desired. Oxygen supply means 20 are connected to the conduit 16 upstream of the control mechanism 18. It is desirable that the oxygen supply 20 should be so connected to shorten the reaction time of the control mechanism 18. However, the oxygen may be directly injected into the cabin 10. An inert gas supply 22 and a total pressure regulator valve 24 are directly connected to the cabin 10. This connection is preferably made to the cabin because it is the pressure within the cabin which is of primary concern and when this pressure is too low or too high immediate correction thereof is desirable.

The oxygen partial pressure control mechanism 18 comprises a sealed casing 26 from which extends one conduit 28 interconnecting with the conduit 16 to bleed off a portion of the gas passing therethrough. An outlet conduit 30 extends from the casing 26 into connection with the conduit 16 at a point downstream from the connection of the conduit 28. Mounted within the casing 26 is an oxygen partial pressure sensor 32 and a total pressure sensor 34 which are electrically interconnected to a signal modulator and amplifier 36 as will be hereinafter more fully described.

The oxygen supply 20 is connected to a normally closed solenoid valve 38 by conduit 40. Conduit 42 extends from the valve 38 into connection with the conduit 16.

The inert gas supply 22 is connected by a conduit 44 to a normally open solenoid valve 46. The normally open valve 46 is connected to the total pressure regulator valve 24 by a conduit 48. A conduit 50 leads from the valve 24 to the cabin 10.

Figure 2:
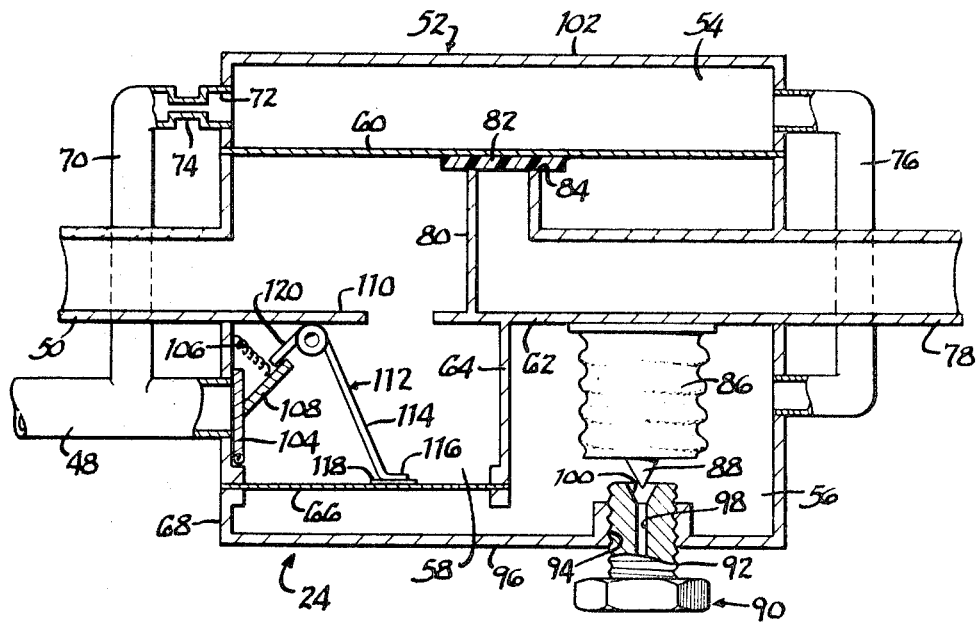
FIG. 2 is a sectional view of one embodiment of a total pressure valve utilized in connection with the control system.

The construction and operation of the valve 24 may best be understood by reference to FIG. 2. This valve comprises a sealed casing 52 having three separate chambers 54, 56, 58. The chamber 54 is defined by the casing and a flexible diaphragm 60 which extends entirely across the casing 52. The chamber 56 is defined by a horizontal wall 62 extending across the entire width of the casing 52, a vertical wall 64 extending downwardly therefrom and terminating short of the bottom of the casing and a flexible horizontally extending diaphragm 66 which extends between the lower end of the vertical wall 64 and the casing wall 68. The third chamber 58 is, of course, defined by the diaphragm 60, the walls 62, 64 and diaphragm 66.

The conduit 48 from the inert gas supply 22 extends through an opening in the casing wall 68 and terminates within chamber 58. A bleed conduit 70 extends from the conduit 48 exteriorly of the casing 52 and extends into an opening 72 in the casing wall 68 above the diaphragm 60 to thus terminate in chamber 54. A fixed restriction 74 is provided in the conduit 70 adjacent the opening 72 to restrict the flow of the inert gas while providing a control pressure within chamber 54. The conduit 50 extends from the chamber 58 to the interior of the cabin 10.

A conduit 76 extends from the chamber 54 to the chamber 56 to supply the inert gas to establish a control pressure in chamber 56. A vent conduit 78 extends from the chamber 58 to a point exterior of the casing 52 to vent gas therefrom when the pressure therewithin is above a predetermined level. The conduit 78 has an upwardly extending projection 80 which terminates just short of the diaphragm 60. The diaphragm 60 has a valve element 82 which normally seats against the end 84 of the projection 80 to close the vent conduit.

A predetermined control pressure is maintained within the chambers 54 and 56 by means of a sealed aneroid 86 provided on the underside of the wall 62. The aneroid 86 comprises a bellowslike element which is filled with a gas. The aneroid carries a valve element 88 at its lower end. An adjustable vent element 90 having a threaded shank 92 is threadingly received in a threaded opening 94 provided in the lower wall 96 of the casing. A passageway 98 extends entirely through vent element 90 and is thus in communication with the interior of the chamber 56. A V-shaped valve seat 100 is provided on the inner end of the shank 92 for the seating of the valve element 88 of the aneroid 86.

In operation, when the pressure within the aneroid 86 is greater than the pressure within chamber 56, the aneroid will expand until a balance point is reached. The flow of the incoming inert gas through the fixed restriction 74 provides a positive pressure within chambers 54 and 56. Consequently, the aneroid will be compressed and assume a position as illustrated in FIG. 2 to permit gas within the chamber 56 to bleed through passageway 98 to thus establish the control pressure within chambers 54 and 56. If the pressure within these chambers drops below the desired control pressure, the aneroid will expand until the valve element 88 moves nearer the valve seat 100 to increase the back pressure within chambers 54 and 56.

When the pressure in chambers 54 and 56 again rises to the desired control pressure, the aneroid 86 will contract to again vent the inert gas flow. As will be appreciated, in operation, the aneroid 86 assumes a position of equilibrium in which the input from restriction 74 exactly equals the inert gas vented from passageway 98.

The pressure within the chamber 58 is the same as the pressure within cabin 10, this chamber being directly connected to the cabin. When the cabin pressure is higher than desired, the diaphragm 60 will deflect away from the position shown towards the casing wall 102 because the pressure in chamber 58 is then higher than the control pressure in chamber 54. This movement unseats the valve element 82 and opens the vent conduit 78 to the chamber 58. Gas will then escape from the chamber 58 through the vent conduit 78 to reduce the pressure in chamber 58 and thus the pressure within the cabin 10. When the desired cabin pressure is again reached, the diaphragm 60 is biased back, by the control pressure in chamber 54, to the position shown in FIG. 2 to close the vent conduit 78.

A structure is provided to open communication between the conduit 48 and chamber 58 when the pressure in chamber 58, and thus in cabin 10, is below the desired total pressure. Opening of communication between the conduit 48 and chamber 58 results in the injection of the inert gas under pressure into the chamber 58 to thus raise the total pressure.

As will be noted, a hinged valve element 104 has a projection 108. One end of a spring 106 is attached to the projection 108, the other end of the spring 106 being attached to the casing wall 68. The spring 106 biases the valve element 104 to seat against the inner end of the conduit 48 as shown to thus close communication between the chamber 58 and conduit 48.

A projection 110 extends inwardly from the wall 68 and has pivotally attached thereto a valve actuating element 112. The element 112 has one leg 114 which extends towards the diaphragm 66. The leg 114 terminates in a foot 116 which slidingly contacts a small plate 118 provided on the upper surface of the diaphragm 66. The actuating element 112 has a second short leg 120 which terminates just above the projection 108 of valve element 104. When the pressure in chamber 58 falls below the desired total pressure, the control pressure of the gas in chamber 56 will cause upward deflection of the diaphragm 66 with resultant counterclockwise pivoting, as viewed in FIG. 2, of the actuating element 112. The leg 120 will contact the projection 108 causing the valve 104 to be pivoted away from the inner end of the conduit 48 and thus open communication between this conduit and the chamber 58. Inert gas under pressure will then be injected into the chamber 58 until the pressure within chamber 58, and thus the cabin 10, again reaches the desired level at which time the diaphragm 66 will be deflected downwardly whereupon the spring 106 will cause closing of the valve element 104.

Figure 3:
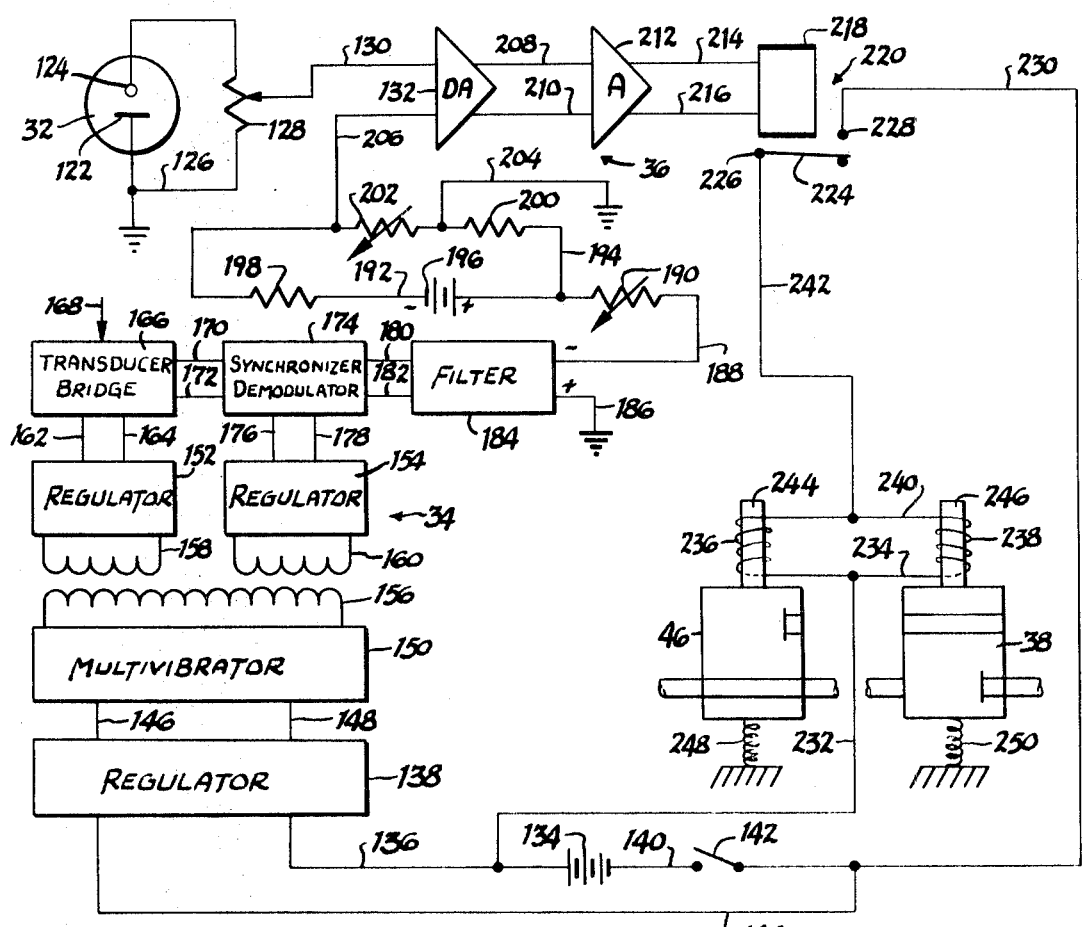
FIG. 3 is an electrical schematic view of the control device for controlling a two component gas mixture.

Referring next to FIG. 3, the means for preferentially controlling the partial pressure of the oxygen within the cabin 10 will now be described. The circuit illustrated in FIG. 3 includes the previously mentioned oxygen partial pressure sensor 32, the total pressure sensor 34, the signal modulator and amplifier 36, the valve 38 in the oxygen supply line and the valve 46 in the inert gas supply line.

As will be recalled, both the oxygen partial pressure sensor 32 and the total pressure sensor 34 are positioned within the sealed casing 26 and are subjected to the gas mixture passing through the conduit 16.

The oxygen partial pressure sensor 32 may be any type of sensor which is commercially available. However, for a high altitude control system it is preferred that the sensor is an electrochemical device for measuring the partial pressure of oxygen in a gas mixture. The commercially available device utilizes a gold indicator electrode and a cadmium reference electrode. The electrodes are provided in a casing which is filled with an electrolyte and encapsulated with a thin polyethylene membrane. The resultant cell generates an electric voltage which is proportional to the oxygen partial pressure of the atmosphere surrounding the cell. The cell does not require electrical power or a polarizing voltage, the voltage therefrom being generated chemically. A more complete discussion of such devices is given in an article entitled "Electrochemical Device for Measuring Oxygen" by J. Ryan Neville in the Review of Scientific Instruments, Volume 33, No. 1, 51—55, Jan. 1962.

As shown in FIG. 3, the electrodes 122, 124 of the sensor 32 are connected by a lead 126 in which is provided a rheostat 128. Lead 130 extends from the rheostat 128 to a differential amplifier 132. The desired level of the signal from the sensor 32 may be selected by suitable adjustment of the rheostat 128.

The total pressure sensor 34 illustrated in FIG. 3 may be any conventional commercially available device, such as the device sold under the trademark DEECEEDUCER, Model DC 2000, by the Solid State Electronics Company. A 28 volt DC battery 134 is provided to excite the total pressure sensor. One lead 136 extends from one side of the battery 134 to the input of the total pressure sensor, the input being a voltage regulator 138. A lead 140 extends from the other side of the battery 134. Lead 144 extends from lead 140 to the voltage regulator 138. A control switch 142 is provided in the lead 140 between the battery 134 and the connection point of the lead 144.

Leads 146, 148 extend from the output of the regulator 138 and excite a multivibrator 150 with the regulated voltage. The multivibrator 150 generates a square wave signal. The output signal of the multivibrator 150 is coupled to a pair of voltage regulators 152, 154, by means of a transformer comprising a primary winding 156 at the output of the vibrator 150 and secondary windings 158, 160 provided on the input side of regulators 152, 154. Leads 162, 164 extend from the regulator 152 to the input of a transducer bridge 166 to deliver a regulated square wave signal thereto. The square wave signal is amplitude modulated in the bridge circuit by a signal proportional to the total pressure. The transducer bridge 166 is a variable reluctance bridge in which the output square wave signal is modulated by a signal proportional to the pressure input, indicated by arrow 168. One leg of the bridge includes a variable reluctance diaphragm type pressure transducer, the reluctance of which varies in accordance with the total pressure within the casing 26. Leads 170, 172 extend from the output of the transducer bridge 166 to a synchronous demodulator 174. A regulated square wave demodulating signal is fed to the demodulator 174 by means of leads 176, 178 which extend thereto from the second regulator 154. Leads 180, 182 extend from the output of the demodulator 174 to a filter 184 the output of which is a DC signal, the level of which varies inversely in accordance with the pressure input to the transducer bridge 166, this pressure input being the total pressure within the casing 26.

Lead 186 grounds the positive side of the output of the filter 184. A second lead 188 extends from the negative side of the filter output. Variable resistance 190 is provided in lead 188 to permit adjusting the level of the signal from the filter.

The lead 188 is connected to a circuit comprising leads 192, 194. A battery 196 and fixed resistor 198 are provided in the lead 192. The positive side of the battery 196 is connected in series with the output of the filter 184. A fixed resistor 200 and variable resistor 202 are provided in the lead 194. A lead 204 extends from a point between the resistors 200, 202 to ground. The complete circuit for the signal from the filter 184 thus comprises lead 188, variable resistor 190, lead 194, fixed resistor 200, lead 204 to ground and from ground through leads 186 back to the filter 184.

The complete circuit for the battery 196 comprises lead 192, fixed resistor 198, lead 194, variable resistor 202 and fixed resistor 200. The variable resistor 202 controls the level of the voltage applied to lead 206 and can be adjusted as the battery degrades. The resultant voltage in the battery circuit is the algebraic sum of the voltage of battery 196 plus the emf signal from the filter 184, the emf from the filter 184 being the voltage drop across resistor 200. Thus, the level of the voltage applied to lead 206 will vary in accordance with the output of the filter.

Lead 206 extends from the connection point of leads 192, 194 to the positive side of the differential amplifier 132.

The signal thus fed to the differential amplifier is that developed in the battery circuit as modulated by the output of the filter 184.

The differential amplifier 132 is a device which will amplify the difference between two input signals. A typical commercial example of such an amplifier is Model P65 marketed by Philbrick Researches, Inc.

It should be noted at this point that the output of the oxygen partial pressure sensor and of the total pressure sensor vary as substantially a linear function. This characteristic is taken advantage of in the present invention to provide automatic compensation to provide the proper oxygen partial pressure at any given total pressure. The output of the oxygen partial pressure sensor 32 decreases with a decrease in the partial pressure of the oxygen. Similarly, the output of the total pressure sensor 34 increases with a decrease in total pressure. This results in an increase in the signal from the circuit of the battery 196. Thus, the differential amplifier 132 will develop an output signal with either a decrease in oxygen partial pressure or a decrease in total pressure. The output of the differential amplifier is eventually utilized to control the injection of oxygen. When the differential amplifier provides an output signal oxygen is injected into the conduit 16.

Thus, assuming a decrease in the oxygen partial pressure with the total pressure remaining constant, oxygen will be injected. Similarly, with the decrease in total pressure with the oxygen partial pressure remaining constant oxygen will be injected. An increase in total pressure with the oxygen partial pressure remaining constant will not result in the injection of oxygen. Similarly, an increase in the partial pressure of the oxygen with the total pressure remaining constant will not result in the injection of oxygen. This arrangement is in accordance with the concept of maintaining a constant alveolar oxygen tension which requires an increase in oxygen partial pressure upon a decrease in total pressure.

It will be appreciated that in accordance with the present system there is no provision for extracting oxygen when the partial pressure thereof is above the desired level. However, oxygen is consumed by breathing and when the partial pressure thereof is too high, the situation will not exist for any length of time.

The differential amplifier 132 always emits a signal because there is always some slight imbalance between the signals from the total pressure sensor 34 and the oxygen partial pressure sensor 32. However, until this emitted signal reaches a predetermined value, it is not sufficient to energize the system. The signal from the differential amplifier 132 is fed via leads 208, 210 to a power amplifier 212. The amplified signal is then fed via leads 214, 216 to the coil 218 of a relay 220. The relay 220 is a sensitive relay and will react to small changes in the output of the amplifier 212.

Relay 220 has a normally open contact. As will be noted, switch arm 224 is connected at one end to binding post 226, the other end being biased away from binding post 228. Lead 230 extends from post 228 to one side of the battery 134. Lead 232 extends from the other side of the battery 134 into connection with a lead 234. Lead 234 connects one end of coils 236, 238 in parallel. The other end of these coils are connected in parallel by lead 240. Lead 242 extends from lead 240 to the post 226. Coils 236, 238 act upon armatures 244, 246. Armature 244 is provided to actuate the inert gas valve 46 to the closed position when energized. Armature 246 is provided to actuate oxygen valve 38 to the open position when energized. These valves are biased to their normal positions by, respectively, springs 248, 250.

In operation, when the relay 220 is not energized, the valves 38, 46 assume their normal positions. Communication between the oxygen supply 20 and conduit 16 is thus closed.

Communication of the inert gas supply 22 and the total pressure valve 24 is open. Inert gas will thus be supplied to the system if the total pressure falls below a predetermined value.

When the relay 220 is energized, the circuit through the coils 236, 238 is closed, causing the oxygen valve 38 to open and the inert gas valve 46 to close. Oxygen will then be injected into the system until the oxygen partial pressure is at the desired level. When this occurs, the relay 220 will be deenergized and the inert gas supply will again be available to compensate for any reduction in the total pressure.

Figure 4:
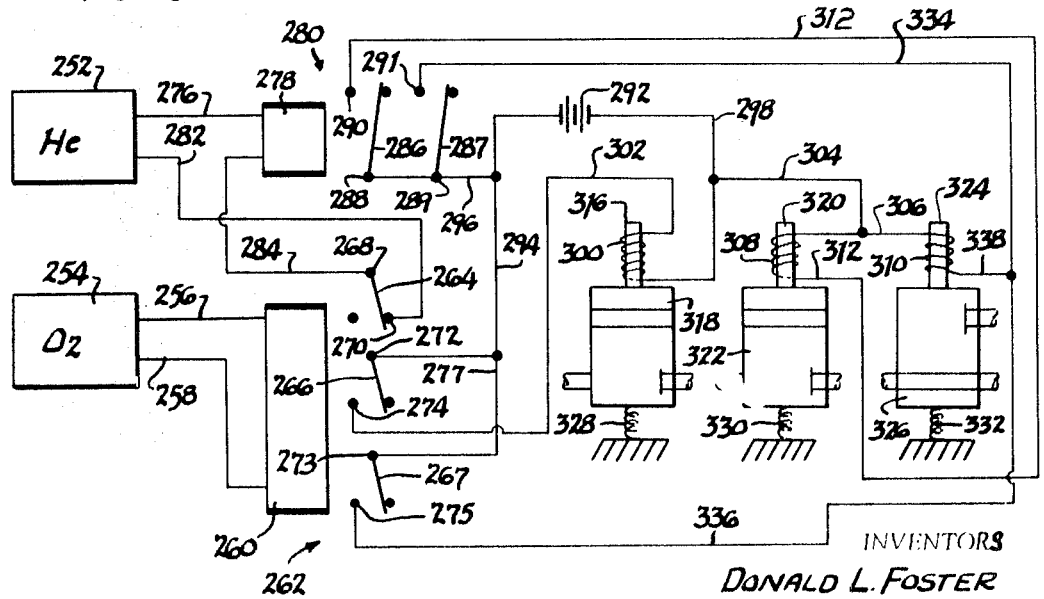
FIG. 4 is an electrical schematic view of a control system for controlling a three component gas mixture.

FIG. 4 illustrates application of the present invention to a control system for a three component gas mixture. For illustrative purposes, the gas mixture may be considered to comprise helium, oxygen and nitrogen. A control system 252 is provided for controlling the partial pressure of the helium. This system is identical with that described for oxygen in FIG. 3 excepting that a helium partial pressure sensor is used instead of an oxygen partial pressure sensor. A control system 254 is also provided for the oxygen component. This system is identical with that described in connection with FIG. 3. The output of the oxygen control system 254 is fed via leads 256, 258 to the coil 260 of a relay 262. The relay 262 is a triple pole relay having two normally open contacts and one normally closed contact. Switch arm 264 is connected at one end to binding post 268 and normally closes against binding post 270. Switch arm 266 is connected at one end to binding post 272 and is normally biased away from binding post 274. Switch arm 267 is connected at one end to binding post 273 and is normally biased away from binding post 275.

A lead 276 extends from the output of the helium control device 252 to coil 278 of relay 280. A second lead 282 extends from the control device 252 to the binding post 270. Lead 284 extends from the other binding post 268 to the other side of the relay coil 278. The relay 280 is a double pole relay and has two normally open contacts. One switch arm 286 is connected at one end to binding post 288 and is biased away from binding post 290. The other switch arm 287 is connected to binding post 289 and is biased away from binding post 291.

The oxygen relay 262 is effective, when energized, to close a circuit through a battery 292. Lead 294 extends from post 272 to one side of the battery 292. A branch lead 296 extends from the lead 294 to the post 288 of the helium relay 280. Lead 298 extends from the other side of the battery 292 into connection with one end of coil 300. The other end of coil 300 is connected to post 274 via lead 302. A branch lead 304 extends from lead 298 to a lead 306 which connects one end of coils 308, 310 in parallel. Lead 312 connects the other ends of coil 308 to post 290 of relay 280.

The coil 300 has an armature 316 for actuation of normally closed valve 318. Valve 318 controls the injection of oxygen into the gas system. Coil 308 has an armature 320 for actuation of a normally closed valve 322 which controls the injection of helium into the gas system. Coil 310 has armature 324 for actuating normally open valve 326. Valve 326 controls the injection of nitrogen into the total pressure valve of the system as previously described in connection with the embodiment of FIGS. 1—3. The valves 318, 322, 326 are biased to their normal positions by springs 328, 330, 332, respectively.

In operation of the FIG. 4 control system, when the oxygen partial pressure is below a predetermined value, relay 262 is energized. Energization of this relay closes the circuit through coil 300 to cause actuation of the valve 318 to the open position for supplying oxygen under pressure to the gas system. Oxygen will continue to be supplied until the desired partial pressure is reached at which time relay coil 260 will be deenergized and the circuit through coil 300 opened. During the time when the relay 262 is energized, the helium valve 322 will remain closed regardless of whether or not the helium partial pressure is below that desired. This results from the fact that energization of relay 262 causes the normally closed switch arm 264 to move to an open position, thus opening the circuit through the relay coil 278 and preventing energization thereof by the helium control circuit.

The normally open nitrogen valve 326 is actuated to the closed position when relay 262 is energized. As will be noted, closure of switch arm 267 completes a circuit between the battery 292 and coil 310. This circuit may be traced through arm 267, post 273, leads 277, 294, battery 292, lead 298, lead 304, lead 306, coil 310, lead 338, lead 336 and post 275.

When the oxygen partial pressure is at the desired level, helium will be added if the partial pressure thereof is below the minimum desired level. As will be appreciated, when the helium partial pressure is below the minimum desired level, a signal from the control circuit 252 causes energization of relay 280 closing switch arms 286 and 287. Closure of switch arm 286 completes a circuit between the battery 292 and coil 308 to actuate the valve 322 to the open position. This circuit may be traced through arm 286, post 288, lead 296, lead 294, battery 292, lead 298, lead 304, lead 306, coil 308, lead 312 and post 290. Helium will be added until the partial pressure thereof reaches the desired level at which time relay 280 is deenergized, resulting in the valve 322 being biased to the closed position.

During periods of energization of the relay 280, the nitrogen valve 326 is actuated to the closed position. This circuit may be traced through arm 287, post 291, lead 334, lead 338, coil 310, lead 306, lead 304, lead 298, battery 292, lead 294, lead 296 and post 289. Upon deenergization of the relay 280, the valve 326 is biased to its normally open position via spring 332.

As can readily be appreciated, the control systems described above provide improved means for maintaining the oxygen partial pressure of a two or more mixed gas compositions and at a predetermined level with respect to the total pressure of the gas mixture. Each control device provides an improved arrangement for maintaining the oxygen partial pressure at a predetermined level with respect to the total pressure within a mixture of gases with the primary control in the two or three component gas mixture described above being the oxygen partial pressure. In other words, if both the total pressure and the oxygen partial pressure are simultaneously below selected levels, the first response of the control system is to raise the level of the oxygen partial pressure without any addition of one or both of the other components of the gas mixture within the system.

The improved control system also provides an automatic compensation of the oxygen partial pressure level to maintain a constant alveolar oxygen tension regardless of the total pressure level at which the system is being operated. This unique feature of the system described above is of particular importance when utilizing the control system in a pressurized chamber in which human beings are consuming the oxygen supplied from the system. This necessarily follows since it is extremely important that the alveolar oxygen tension remain the same irrespective of the total pressure within a controlled atmosphere.

Figure 5:
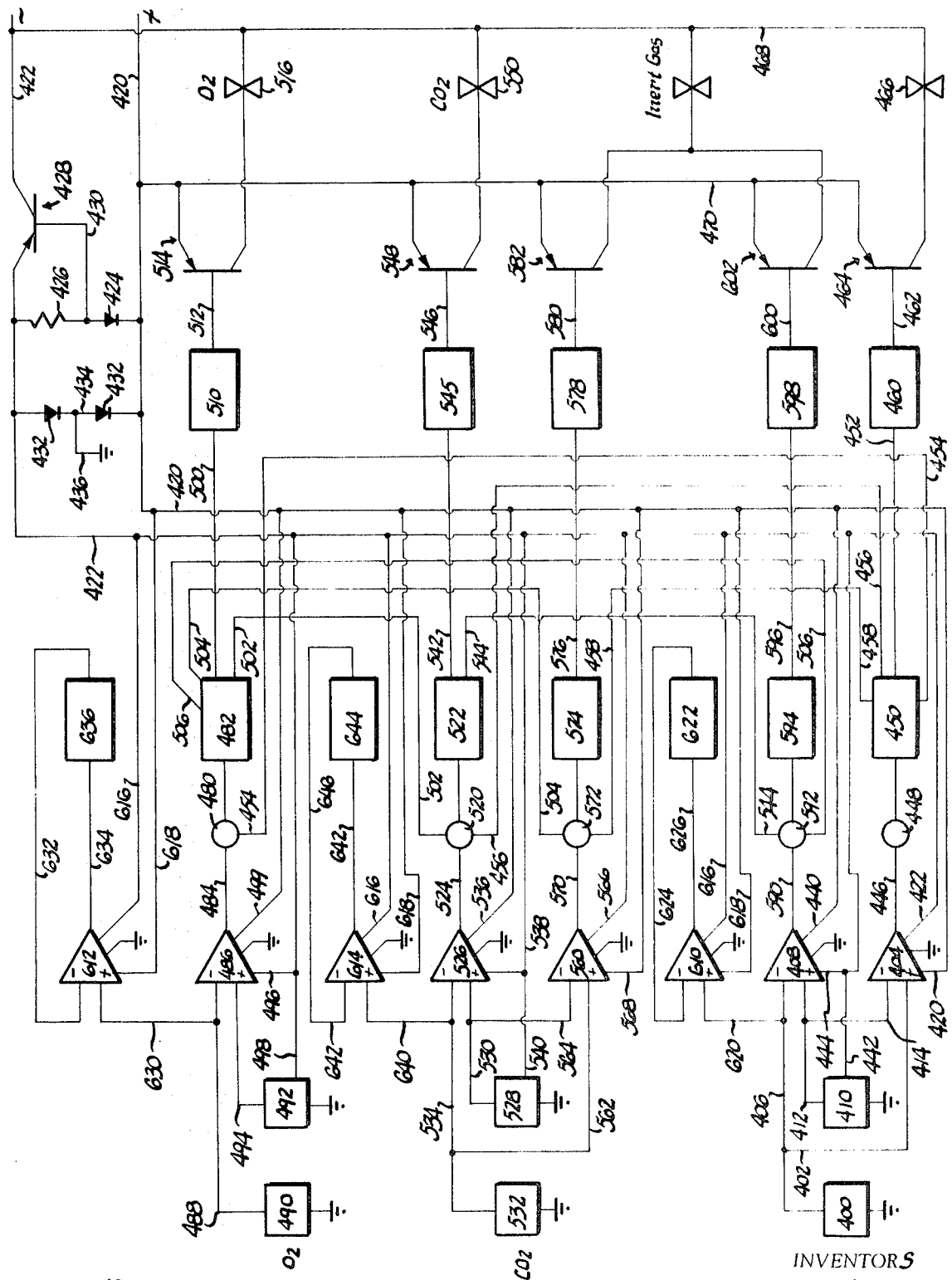
FIG. 5 is a diagrammatical illustration of a modified control system for controlling the total pressure as well as the partial pressure of the components of a gas mixture.

A modified form of control system for a three or more component gas mixture is shown in FIG. 5. The modified control system in FIG. 5 is particularly adapted for use in conjunction with a collapsible or hard chamber at approximately sea level pressure. In the embodiment illustrated in FIG. 5, the pneumatic pressure controller 24 shown in the embodiment of FIGS. 1—4 is replaced by an electronic total pressure controller or sensor so that the control system is capable of maintaining the total pressure within an extremely narrow pressure band, such as 5 millimeters of mercury pressure.

For purposes of illustration, the gas mixture may be considered to comprise oxygen, carbon dioxide and an inert gas, such as nitrogen. The respective gases may be supplied from a suitable source (not shown) directly to a cabin or chamber, such as the cabin 10 shown in FIG. 1, with suitable electrically actuated valves disposed between each gas source and the cabin or chamber.

The total pressure sensor 400 may be of the absolute pressure type which is disposed within the cabin to maintain the pressure at a predetermined level or a differential pressure sensor communicating with the ambient atmosphere surrounding the chamber to maintain the pressure within the chamber at a predetermined level above the surrounding ambient atmosphere. The total pressure sensor 400 emits a continuous linear signal through line 402 to a first differential amplifier 404 and via branch line 406 to a second differential amplifier 408.

A continuous reference voltage is supplied to the differential amplifiers 404 and 408 from a reference voltage source 410 via line 412 to the positive input of differential amplifier 408 and via branch line 414 to the negative input of the differential amplifier 404. As can be seen, the output signal from the total pressure sensor 400 is connected to the positive input of the differential amplifier 404 while being connected to the negative input of the differential amplifier 408, for a purpose to be described later.

A common voltage source is supplied to the control system through lines 420 and 422. In order to maintain a constant voltage supply to the control system the source preferably includes a voltage regulator in the form of a zener diode 424 and a fixed resistor 426 interconnecting the power source lines 420 and 422. A transistor switch 428 is disposed in the line 422 between the input source and the parallel circuit line containing resistor 426 and diode 424. The base of the transistor 428 is connected to the parallel circuit intermediate the diode 424 and the resistor 426 by a line 430. By way of example, the input voltage supplied to the lines 420 and 422 may be a 30 volt DC voltage source and the zener diode 424 may be a 27-volt diode. The zener diode 424 acts as a short circuit for all volts above its rated voltage and will therefore maintain the voltage between lines 420 and 422 at 27 volts.

A pair of zener diodes 432 are disposed in a line 434 interconnecting the lines 420 and 422 downwardly of the zener diode 424. The line 434 is grounded at 436 intermediate the two zener diodes 432. In the illustrated embodiment, the zener diodes 432 are each a 13.5 volt diode to equally divide the voltage output of the regulator into two voltage sources. This arrangement will provide a positive voltage through line 420 and a negative voltage through line 422 downwardly of the zener diodes 432.

The positive voltage source line 420 is connected directly to the differential amplifier 404 and is connected by branch line 440 to differential amplifier 408. The negative voltage line 422 is connected directly to the differential amplifier 404 and also connected to the reference voltage source 410 via branch line 442 and to differential amplifier 408 via line 444.

The output of the differential amplifier 404 is therefore dependent upon the linear output signal of the differential pressure sensor 400 and the output of the reference signal source 410. The total pressure transducer or sensor 400 is of the commercially available type and produces a negative signal which is proportional to the total pressure within the chamber. That is to say, as the pressure within the chamber increases, the voltage output from the sensor or transducer increases. It should be noted at this point, although the two input terminals of the differential amplifiers are disclosed as positive and negative, this is considered to be a relationship only since both signals to the amplifiers are negative and the term positive is merely a relative term with respect to the two signals. That is to say that as the negative signal of one source decreases with respect to the other source, a relative positive voltage will be developed in the differential amplifier which will produce an output signal.

Therefore, as the total pressure within the chamber increases to a point above that desired within the chamber, the output signal of the pressure sensor 400 passing through line 402 will eventually become less negative than the reference signal produced by the reference source 410 to thereby produce an output from differential amplifier 404 through line 446.

However, so long as the reference signal through line 414 to differential amplifier 404 is less negative than the output signal from pressure sensor 400 via line 402 to differential amplifier 404 no signal will pass through line 446 connected to connector terminal 448 "Nand" gate or inverter 450. A zero signal into "Nand" gate 450 will be inverted and produce a positive signal output to lines 452, 454, 456 and 458. The output signal from "Nand" gate 450 is passed via line 452 to a second "Nand" gate 460 and is again reversed to produce a zero signal or no signal in line 462 connected to the base of a switching transistor 464.

However, when the pressure within the chamber is higher than that desired, the output signal through line 402 into differential amplifier 404 will be less negative than the signal produced by the reference source 410 to thereby initiate a signal passing through line 446 into "Nand" gate 450. The signal through line 446 will result in a "no signal" in lines 452, 454, 456 and 458. The "no signal" passing into "Nand" gate 460, will produce an output signal in line 462 to the base of switching transistor 464 to thereby energize solenoid operated valve 466 connected to the power source through lines 468 and 470 to open the valve which interconnects the chamber with the ambient atmosphere (not shown) allowing the pressure to be reduced in the chamber.

Once the pressure has been reduced to be equal to or below that desired within the chamber the output signal of differential amplifier 404 will be reduced to zero which will again produce a signal in line 452 that is inverted to a "no signal" in line 462 by "Nand" gate 460. This again will deenergize the base of the switching transistor 464 to deenergize and close the vent valve 466.

The oxygen partial pressure control circuit, to be described now, is directly dependent upon the proper condition of the overpressure control circuit just described. For this purpose, the line 454 of "Nand" gate 450 is connected to a connector terminal 480 of "Nand" gate 482 which is part of the oxygen partial pressure control circuit. A second line 484 is also connected to the connector terminal 480 of "Nand" gate 482. The line 484 is connected to the output terminal of a differential amplifier 486, which has its negative input terminal connected via line 488 to an oxygen partial pressure sensor 490. The positive input terminal of differential amplifier 486 is connected to a reference voltage source 492, identical to reference voltage source 410, through line 494. A negative voltage is supplied to differential amplifier 486 from line 422 via line 496 and to reference voltage source 492 via line 498 and a positive voltage is supplied to amplifier 486 through branch line 499.

Whenever the signal output from partial pressure sensor 490 is less negative than the signal output from the reference source 492, a positive signal will be developed in line 484. This signal will pass through connector terminal 480 into "Nand" gate 482 and will produce a zero signal output to line 500, 502, 504 and 506 if a signal is also available in line 454. The zero signal through line 500 will pass into "Nand" gate 510 and produce a positive signal in line 512 connected to the base of switching transistor 514 to energize oxygen solenoid valve 516 and supply oxygen to the chamber. However, if the vent valve 466 is energized no signal will be received through line 454 from "Nand" gate 450 and therefore the signal produced in line 484 will be grounded within "Nand" gate 482. This means that the oxygen valve 516 cannot be energized unless the pressure within the chamber is equal to or below the desired pressure level within the chamber.

If the oxygen partial pressure is equal to or higher than that desired within the chamber, the signal in line 484 will be zero which will be inverted in "Nand" gate 482 thereby producing a signal in line 500, 502, 504 and 506, the purpose of which will be described hereinafter.

The carbon dioxide partial pressure control circuit is directly dependent upon the proper condition of the overpressure control circuit and the oxygen partial pressure control circuit. For this purpose, output line 456 of "Nand" gate 450 and line 502 of "Nand" gate 482 are connected to terminal connector 520 of "Nand" gate 522, part of the carbon dioxide underpressure control circuit. A line 524 interconnects the output terminal of a differential amplifier 526 to the connector terminal 520 of "Nand" gate 522. A voltage reference source 528, identical to voltage reference source 410, is connected to the positive input terminal of differential amplifier 526 through line 530. A carbon dioxide partial pressure sensor 532 is connected via line 534 to the negative input terminal of differential amplifier 526.

A positive voltage is supplied to differential amplifier 526 from source line 420 through branch line 536 and a negative voltage is supplied from source line 422 via branch line 538. The negative voltage is also supplied to the reference voltage source 528 through branch line 540.

Assuming that the total pressure and oxygen partial pressures within the chamber are at the desired level, a signal will be received through lines 456 and 502, respectively, to "-Nand" gate 522. These signals will be grounded within "-Nand" gate 522 unless a signal is received through line 524. When the carbon dioxide partial pressure falls below a predetermined level, the output signal in line 534 will be less negative than the reference signal received by the differential amplifier via line 530 to produce an output signal in line 524. This will produce a "no signal" in lines 542 and 544 and the "no signal" in line 542 will be received by the "Nand" gate 545 and converted to a positive signal in line 546 connected to the base of switching transistor 548 to thereby energize solenoid valve 550 and allow carbon dioxide to be injected into the chamber.

If the carbon dioxide pressure is too high no signal will be transmitted through line 524 which consequently will deenergize solenoid 550 and close the carbon dioxide valve 550.

The carbon dioxide partial pressure control also includes an overpressure control. For this purpose, the output signal of carbon dioxide partial pressure sensor 532 is also connected to the positive input terminal of a differential amplifier 560 through branch line 562 while the negative terminal of differential amplifier 560 is connected by branch line 564 to the reference signal source 528. Differential amplifier 560 is provided with a negative voltage from source line 422 via branch line 566 while a positive voltage is supplied from source line 420 through branch line 568. The output terminal of differential amplifier 560 is connected through line 570 to connector terminal 572 of "Nand" gate 574. The carbon dioxide overpressure control circuit is also dependent upon the proper condition of cabin overpressure and oxygen partial pressure. For this purpose, the connector terminal 572 also has output line 458 of "Nand" gate 450 and output line 504 of "Nand" gate 482 connected thereto.

Therefore, if the carbon dioxide partial pressure sensor senses a carbon dioxide pressure greater than that desired with respect to the total pressure within the chamber, the output signal in branch line 562 will be more negative than the signal in 564 received by differential amplifier 560 which in turn will produce an output signal in line 570. Assuming a signal is being received from "Nand" gate 450 through line 458 and "-Nand" gate 482 via line 504, the signal requirements of "-Nand" gate 574 will be met to therefore produce a "no signal" in line 576 which will be converted to a positive signal by "-Nand" gate 578 to energize the base of switching transistor 582 through line 580 and thereby energize solenoid valve 584 intermediate the inert gas source and the cabin. This will result in increasing the total pressure by injecting an inert gas therein which will result in an overpressure condition, causing the overpressure exhaust valve to open purging as from the chamber to reduce the partial pressure of the carbon dioxide within the system.

Referring again to total pressure sensor or transducer 400 and differential amplifier 408, so long as the total pressure within the chamber is equal to or above the desired pressure level the output signal from sensor 400 through line 406 to the negative terminal of differential amplifier 408 will be more negative than the signal received from reference source 410 via line 412. This will result in a "no signal" in line 590 connected to the output terminal of differential amplifier 408 and the connector terminal 592, which also has line 544 of "-Nand" gate 522 and line 506 of "Nand" gate 482 connected thereto and is associated with "Nand" gate 594. Assuming the "Nand" gate 482 and 522 are each producing an output signal indicating the oxygen and carbon dioxide partial pressures are at the predetermined levels, these signals are received at the connector terminal 592 of "Nand" gate 594, and the signals will be grounded within "Nand" gate so long as there is no signal output through line 590. However, once the total pressure within the chamber falls below the predetermined level, the negative input terminal of differential amplifier 408 becomes less negative than the positive terminal thereby producing an output signal in line 590. This signal will be operative to produce a "no signal" from "Nand" gate 594 in line 596 connected to a second "Nand" gate 598. The second "Nand" gate will again convert the signal to produce a positive signal in line 600 connected to the base of the switching transistor 602, activate the switching transistor to energize the solenoid valve 584 interposed between the inert gas source and the chamber. This, of course, will increase the total pressure within the chamber until the desired pressure level is reached, whereupon the signal output in line 590 will turn to zero which will result in solenoid valve 584 becoming deenergized.

Preferably, the control system is provided with means for indicating the total pressure within the chamber as well as the partial pressure of each of the controlled gases within the chamber. For this purpose, three voltage followers 610, 612, and 614 are provided, with each voltage follower having a negative and positive power source received through lines 616 and 618, respectively. The positive terminal of voltage follower 610 is connected to the output signal or line 406 of the total pressure sensor 400 through branch line 620 while the negative input terminal is connected in series with the output terminal of the voltage follower by lines 624 and 626 with an indicator 622 interposed between the two lines.

Likewise, the voltage follower 612 is connected to the output line 488 of the oxygen partial pressure sensor 490 through line 630 while the negative input terminal and the output terminal of the voltage follower are connected in series by line 632 and 634 with an indicator 636. The voltage follower 614 has the positive terminal connected to output line 534 of carbon dioxide partial pressure sensor 532 through line 640 and the negative input terminal of the voltage follower 614 is connected in series with the output terminal through lines 642 and 646 having an indicating device 644 operatively interposed therebetween.

As can readily be appreciated, the respective voltage followers may be calibrated or adjusted so that the signal output received by the respective indicators is a direct indication of the pressure of the respective gas or gas mixture to be measured.

It should be noted that all of the differential amplifiers and voltage followers have been shown as being connected to a ground, any common reference voltage may be supplied in place of the ground connection for an appropriate reference point for operation of the subject devices.

OPERATION

The control system shown in FIG. 5 provides a means for sequentially controlling the various pressures in the following order: (1) Chamber overpressure; (2) Oxygen injection; (3) High or low carbon dioxide pressure; and (4) Injection of an inert gas, such as nitrogen or helium, to control the total pressure. The above sequential control is accomplished by interconnecting the total chamber overpressure control circuit with the control circuit of the oxygen partial pressure solenoid 516, the control circuit of the carbon dioxide solenoid valve 550 and the control circuit of the inert gas solenoid valve 584. Also, the oxygen partial pressure control circuit is operatively connected to the control circuit for solenoid valve 550 controlling carbon dioxide injection, and the two control circuits for controlling the solenoid valve 584 controlling the injection of the inert gas into the system.

The first order of control as indicated above is the chamber overpressure. Therefore, whenever the chamber pressure is higher than a predetermined value, a signal output will be received by "Nand" gate 450 which will be inverted and received by "Nand" gate 460 and again be inverted to energize the base of transistor 464 and open the vent valve 466. While a signal is being passed through line 446 to "Nand" gate 450, which signal is inverted to a "no signal" output, no other solenoid valves may be operated since the output of the "Nand" gate 450 is zero and is interconnected with the oxygen and carbon dioxide control circuits. This means that any signal output from differential amplifier 486 connected to oxygen partial pressure sensor 490, differential amplifiers 526 and 560 connected to the output of carbon dioxide partial pressure sensor will be automatically grounded within the respective "Nand" gates connected in series with the output signal of the respective differential amplifier output signals.

Once the overpressure condition has been remedied the signal output of differential amplifier 404 will turn to zero which in turn will be inverted by "Nand" gate 450 to produce a positive signal in lines 454, 456 and 458. Assuming now that the differential amplifier 486 is producing an output signal, indicating that the oxygen partial pressure is low, the combined signals through line 484 and 454 will render "Nand" gate 482 operative to produce a "no signal" in line 500, which is inverted by "Nand" gate 510 to energize solenoid 516 and inject oxygen into the chamber.

While oxygen is being injected into the chamber the signal in lines 502, 504 and 506 are zero which lines are operatively interconnected to the "Nand" gates 522, 574 and 594, so that any other signal received by these respective "Nand" gates will be grounded within the respective gate. While the signal is being grounded within the respective "Nand" gate, the output signal of each of the gates is positive which is again inverted by the respective associated "Nand" gates 545, 578 and 598, each of which will produce no output signal to thereby maintain the solenoid valves 550 and 584 deenergized.

Referring now to the carbon dioxide partial pressure, a pressure below the desired minimum level will produce an output signal in line 524, which when combined with signals received from lines 456 and 502, will produce a signal into "Nand" gate 522. The output signal of "Nand" gate 522 will result in a "no signal" in lines 542 and 544 with "no signal" in line 542 will again be inverted by "Nand" gate 545 to energize solenoid valve 550 and inject carbon dioxide into the system. While carbon dioxide is being injected into the system the "no signal" through line 544 will render the "Nand" gate 594, disposed in the low total pressure circuit, inoperative to result in a positive signal in line 596 which is again inverted by "Nand" gate 598 to maintain the inert gas solenoid valve 584 deenergized.

The low pressure circuit for injecting inert gas into the chamber can only be operated when a signal is received through line 506 indicating that the oxygen partial pressure is at the desired level and a signal is received through line 544 indicating that the carbon dioxide partial pressure is at the desired level. When these two conditions have been met, any signal output from line 590 of differential amplifier 408 will be received by "Nand" gate 594 and inverted to a "no signal" in line 596 which is again inverted to a positive signal in line 600 to thereby energize solenoid valve 584 and inject inert gas into the system to raise the total pressure to the desired level.

Summarizing briefly the operation of the control system of FIG. 5, whenever the total pressure within the chamber is above a desired value the vent valve 466 will be energized to reduce the pressure within the chamber. The oxygen partial pressure solenoid valve 516 can only be energized when the total pressure is equal to or less than the predetermined total pressure desired. Likewise, the carbon dioxide solenoid valve 550 can only be energized when the total pressure is at or below a desired level and the oxygen partial pressure is at the desired level. Likewise, the inert gas can only be injected into the system when the oxygen partial pressure and the carbon dioxide partial pressure are at a predetermined level.

As can readily be appreciated, the control system shown in FIG. 5, provides a very accurate means of maintaining the total pressure of a chamber at a predetermined level and at the same time maintaining the partial pressure of two or more gases forming the gas mixture within the chamber at predetermined pressure. Although not limited to such particular uses, the control system in FIG. 5 is particularly adapted for maintaining a predetermined pressure in a collapsible chamber, such as an oxygen tent, while at the same time accurately maintaining the partial pressure of one or more of the gases forming the gas mixture at a predetermined level irrespective of the total pressure within the chamber so long as the total pressure is greater than the sum of the controlled partial pressures. This can readily be accomplished by using a differential pressure sensor or transducer which is in communication with the ambient atmosphere surrounding the collapsible chamber. The control system is likewise capable of maintaining a predetermined absolute pressure by using an absolute pressure sensor or transducer 400, where it is desired to maintain a constant total pressure within the chamber irrespective of the ambient atmosphere surrounding the chamber.

Although the control system shown in FIG. 5 has been illustrated as controlling two gas components of a gas mixture within a chamber, it is readily apparent that any number of gas components may be maintained at a predetermined partial pressure with respect to the total pressure in the chamber by merely adding additional sensors and appropriate control circuitry such as that disclosed for the oxygen partial pressure control. Furthermore, any one of the gases may be preferentially controlled by merely substituting the appropriate partial pressure sensor for the oxygen partial pressure sensor.

Therefore, while several preferred embodiments of the invention have been shown and described, it will be understood that various changes and modifications can be made without departing from the spirit of the invention and the invention is to be limited only by the following claims.

We claim:

1. A gaseous atmosphere control device for a mixture of a plurality of gases confined in a chamber, comprising a supply source of each of the gases in communication with the chamber, an electrically actuated valve between each of the supply sources and the chamber, partial pressure control means for each of the gases of the gas mixture less one, each of said partial pressure control means comprising means for developing an electrical signal proportional to the partial pressure of the respective gas, means for developing an electrical signal proportional to the total pressure of the gas mixture, means for differentially amplifying said two signals, electrical control circuit means connecting each of said electrically actuated valves to its respective partial pressure control means receiving said differentially amplified signal and responsive to a predetermined signal level to energize the respective valve to cause actuation thereof to the open position for injection of the respective gas into the chamber, and means responsive to the total gas pressure in the chamber to cause opening of communication between the chamber and the supply of the one gas which is not subject to partial pressure control when the total gas pressure falls below a predetermined value.

2. A control system as defined in claim 1, wherein all of said signals received by the differential amplifying means are linear in function.

3. A control system as defined in claim 1, wherein the valves between the chamber and the gases subject to partial pressure control being normally closed and the valve between the chamber and the gas not subject to partial pressure control being normally open, and said means responsive to the total gas pressure in the chamber comprises a total pressure regulating valve between the chamber and the supply of gas not subject to partial pressure control.

4. A control system as defined in claim 3, said electrical control circuit means further includes means for preferentially energizing the normally closed valves with respect to each other when two or more energizing signals are received at the same time.

5. A control system as defined in claim 3, said electrical control circuit means includes means responsive to a predetermined signal level for each gas to cause closure of all other valves while the selected gas is being injected into the chamber.

6. A method of controlling the composition and pressure of a gas mixture including a plurality of gases in a chamber, which comprises determining the partial pressure of a first of said gases within said chamber, determining the total pressure of said gas mixture within said chamber, intermittently supplying the first gas from a pressurized source to maintain the partial pressure of the first gas in said chamber at a predetermined pressure, and intermittently supplying a second of said gases from a pressurized source to said chamber when the partial pressure of the first gas is at said predetermined pressure to maintain the total pressure of said gas mixture in said chamber at a predetermined total pressure.

7. A method as defined in claim 6, wherein the first gas is consumable within the chamber and the pressure level of said first gas with respect to the total pressure is proportionately increased as the total pressure is decreased relative to sea level pressure to maintain the first gas at a constant effective pressure level.

8. A gaseous atmosphere control device for a mixture of at least two gases confined in a chamber, comprising a supply source of each of the gases, fluid passageways connecting said sources to the chamber, valves disposed in the respective passageways, an exhaust valve operatively connected to said chamber and control means for controlling the flow of said gases to and from the chamber, said control means comprising a total pressure sensing means operatively connected to a first of said valves and said exhaust valve for maintaining the total pressure in said chamber at a predetermined value, and a partial pressure sensitive means operatively connected to a second of said valves for opening and closing said valve to maintain the pressure of the gas associated with said second valve at a predetermined pressure level.

9. A control device as defined in claim 8, wherein said total pressure sensing device includes means communicating with the ambient atmosphere to maintain the total pressure of said chamber at a predetermined value above the ambient atmosphere.

10. A control device as defined in claim 8, wherein said control means further includes means for maintaining the second of said valves closed when the first of said valves is open.

11. A control device as defined in claim 8, wherein said total pressure control means includes a total pressure sensing device emitting a signal as a function of the total pressure of said mixture and circuit means connecting said signal to said exhaust valve and the first valve to respectively open said exhaust valve when the total pressure is above a predetermined level and said first valve to inject the gas associated with said first valve when the total pressure is below a predetermined level.

12. A control device as defined in claim 11, wherein said partial pressure sensing means includes a partial pressure sensing device emitting a signal as a function of the partial pressure of the associated gas and circuit means connecting the partial pressure signal to the second valve for opening and closing said valve.

13. A control device as defined in claim 12, wherein said total pressure signal and said partial pressure signal are linear signals.

14. A control device as defined in claim 12, further including means connecting the total pressure circuit means to the partial pressure circuit means to render the partial pressure circuit means inoperative when said exhaust valve is open.

15. A control device as defined in claim 8, wherein said mixture includes three gases with the first, second, third and exhaust valves being electrically actuated, said total pressure sensing means including a pressure sensing device producing an electrical signal as a function of the total pressure of said mixture and circuit means connecting said signal to said exhaust and the first valve connected to the first gas source to alternately operate said valves, said partial pressure sensing means including a partial pressure sending device producing a second electrical signal as a function of the partial pressure of the second gas, circuit means connecting the second signal to the second valve to open said valve when the partial pressure of the second gas is below a predetermined level and a second partial pressure sensing device producing a third electrical signal as a function of the partial pressure of the third gas and circuit means connecting the third valve to open said valve when the partial pressure of the third gas falls below a predetermined level.

16. A control device as defined in claim 15, wherein said control means includes means for preventing the simultaneous opening of more than one of said valves.

17. A control device as defined in claim 8, wherein said control means includes indicating means for indicating the total pressure of said gas mixture and the partial pressure of at least one of said gases.

18. In a control system for conditioning a gaseous mixture by controlling the supply of at least a first gas of said mixture through selectively electrically actuated means which comprises means for producing an electric signal which is proportional to the amount of said first gas in said mixture, means for producing a reference signal which is proportional to the desired amount of said first gas in said mixture and electronic control means for comparing said signals and producing a single output signal for controlling said actuating means.

19. A method of controlling the supply of one gas of a gas mixture which comprises generating an electric signal as a function of said one gas in said mixture, generating a reference signal as a function of the desired amount of said one gas in said mixture, comparing said signals and producing a single output signal, and regulating the supply of said one gas to said mixture with said output signal.

20. A control system for controlling the pressure of an enclosed space, including valve means, pressure selector means for selecting a desired pressure having an output voltage related to a selected desired pressure, said output voltage being an electrical reference signal adjustable by means of adjustable electrical control means, whereby desired pressure selections are made by the selection of a particular reference signal, and absolute element having an output related to the pressure of an enclosed space and electronic means for comparing the output voltage from the selector means with the output voltage from the absolute element to produce an output controlling the valve means.

21. A control system as claimed in claim 20, in which the system controls electric valve means.

22. A method of controlling pressure in an enclosed space, for example, an aircraft cabin, by a pressure control system which includes valve means, the method including the steps of generating a voltage proportional to a desired selected pressure by selecting a desired pressure through adjusting an adjustable reference signal to a voltage proportional to the desired pressure, generating a voltage proportional to the pressure of the enclosed space and comparing the voltages by electronic means to produce an output controlling the valve means.

23. A control system for an aircraft cabin including valve means, cabin pressure selector means for selecting a desired cabin pressure having an output voltage related to a desired selected pressure, said output voltage being an electrical reference signal adjustable by means of adjustable electrical control means whereby desired pressure selections are made by the selection of a particular reference signal, an absolute element having an output voltage related to the cabin pressure and electronic means for comparing the output voltage from the cabin pressure selector means with the output voltage from the absolute element to produce an output controlling the valve means.